United States Patent [19]

Mansour et al.

[11] Patent Number: 5,638,297
[45] Date of Patent: Jun. 10, 1997

[54] METHOD OF ON-LINE TRANSIENT STABILITY ASSESSMENT OF ELECTRICAL POWER SYSTEMS

[75] Inventors: Yakout Mansour, Vancouver; Ebrahim Vaahedi, West Vancouver; Allen Y. Chang, Richmond, all of Canada

[73] Assignee: British Columbia Hydro and Power Authority, Vancouver, Canada

[21] Appl. No.: 275,589

[22] Filed: Jul. 15, 1994

[51] Int. Cl.$^6$ .................................................. G06F 19/00
[52] U.S. Cl. ........................................... 364/495; 364/578
[58] Field of Search ............................... 364/578, 492, 364/495; 395/907, 915

[56] References Cited

PUBLICATIONS

Athay et al., "A Practical Method for the Direct Analysis of Transient Stability," Paper No. F 78 251–1 presented at the IEEE PES Winter Meeting, New York, NY, Jan. 29–Feb. 3, 1978, pp. 1–9.

Kumar et al., "Contingency Selection for Dynamic Security Assessment of Large Scale Power Systems," ABB Systems Control Company Inc., paper based on EPRI RP103-2 on Dynamic Security Analysis Using Artificial Intelligence Techniques, PhaseI—Feasibility Evaluation, 7 pages; Apr. 1994.

Fouad et al., "Calculation of Generation–Shedding Requirements of the B.C. Hydro System Using Transient Energy Functions," Paper No. 85 SM 485–8 presented at the IEEE/PES Summer Meeting, Vancouver B.C., Jul. 1985, pp. 1–7.

Chiang et al., "Foundations of the Potential Energy Boundary Surface Method for Power System Transient Stability Analysis," *IEEE Transactions on Circuits and Systems* 35(6): 713–728, 1988.

Fouad and Vittal, "The Transient Energy Function Method," State of the Art Paper, Iowa State University, May 1988, 14 pages.

Fouad et al., "Transient Stability Program Output Analysis," *IEEE Transactions on Power Systems* PWRS–1(1):2–9, 1986.

Kakimoto et al., "Transient Stability Analysis of Large–Scale Power System by Lyapunov's Direct Method," *IEEE Transactions on Power Apparatus and Systems* PAS–103(1):160–167, 1984.

(List continued on next page.)

*Primary Examiner*—Michael Zanelli
*Attorney, Agent, or Firm*—Seed and Berry LLP

[57] ABSTRACT

In the past, in electrical power networks, the effects on the system of particular contingencies, such as a given power line being interrupted, have been modelled off-line, so that the proper response to that contingency can be planned ahead of time and acted upon quickly in the event of such contingency. Such models have generally been overly conservative adding considerable cost to power systems. The present invention provides a method of predicting the transfer limit or the amount of remedial action required to maintain stability of a power system in the event of a study contingency by determining a transient energy margin, comprising the steps of:

a) providing a computer model of the system;

b) simulating the study contingency using a step by step time integration method;

c) measuring the effect on the energy properties in the system which resulted from the study contingency, and if the measured energy properties indicate instability, calculating the transient energy margin from the corrected kinetic energy; and d) if the measured energy properties indicate stability, introducing an artificial contingency into the model which is of sufficient duration to make the system unstable, and measuring the transient energy margin as the difference between the corrected kinetic energy after the artificial contingency and the minimum value of the corrected kinetic energy after the artificial contingency, after compensating for the potential energy change introduced into the system by the artificial contingency.

2 Claims, 7 Drawing Sheets

OTHER PUBLICATIONS

Maria et al., "Hybrid Transient Stability Analysis," *IEEE Transactions on Power Systems* 5(2):384–393, 1990.

Pai, *Power System Stability: Analysis by the Direct Method of Lyapunov*, North–Holland Publishing Company, New York, 1981, pp. vii–xii, 1–251.

Kundur et al., "Rapid Analysis of Transient Stability: Needs, Benefits, and Requirements," paper presented at the 1986 Winter Meeting of the IEEE Power System Engineering Committee, pp. 1–36.

Rahimi et al., "Evaluation of the Transient Energy Function Method for On–Line Dynamic Security Analysis," Paper No. 92 WM 148–7 PWRS presented at the IEEE/PES Jan. 1992 Winter Meeting, New York, pp. 1–7.

Vittal et al., "Transient Stability Analysis of Stressed Power Systems Using the Energy Function Method," *IEEE Transactions on Power Systems* 3(1):239–244, 1988.

Akimoto et al.; *Transient Stability Expert System;* IEEE Trans. on Power Systems, vol. 4, No. 1; Feb. 1989; pp. 312–320.

Sobajic et al.; *An Artificial Intelligence System for Power System Contingency Screening*; IEEE Trans. on Power Systems, vol. 3, No. 2 May 1988; pp. 647–653.

Mansour et al.; *B.C. Hydro's On–Line Transient Stability Assessement (TSA) Model Development Analysis and Post–Processing*; IEEE Trans. on Power Systems, vol. 10, No. 1; Feb. 1995; pp. 241–253.

Dot Product Comparison or a Stable Contingency

Angle Comparison for an Unstable Contingency 5,638,297

METHOD OF ON-LINE TRANSIENT STABILITY ASSESSMENT OF ELECTRICAL POWER SYSTEMS

TECHNICAL FIELD

The invention relates to the field of electrical power systems, and more particularly to methods of assessing the transient stability of such systems.

BACKGROUND ART

In any electrical power network it is desirable to attempt to predict the effects on the system of particular contingencies, such as a given power line being interrupted, so that the proper response to that contingency can be planned ahead of time and acted upon quickly in the event of such contingency. For example, where a major power line is interrupted, by taking action to improve stability, such as high response static exciters, braking resistor, shedding generation capacity and high speed single and three pole reclosing, an entire system failure may be avoided.

In some systems, generation shedding has proven to be one of the most effective discrete supplementary controls for maintaining stability. For every foreseeable disturbance, the amount of generation shedding is calculated and provided to the system operators in a look-up table format. With these tables, the operators preset the generator shedding controls for every major element outage. In the past, these tables have been prepared using off-line calculations. However in real system operation, the conditions frequently do not match those studied off-line, so the guidelines produced are provided on the conservative side. Operating power system networks on such conservative guidelines can have significant cost implications. Therefore it is desirable to provide an effective on-line transient stability method which can assess the dynamic security limits of a power system (the maximum transfer limit or the minimum required remedial action for the system to remain stable) for those contingencies likely to cause dynamic security violations for the operating conditions encountered in real-time.

The North American Reliability Council sets criteria for system dynamic security which require the simulation of complex switching sequence of various equipment in a system at different locations following a fault, based on the actual system structure. Such series of simulated events in such simulations, which simulate possible real contingencies, are referred to herein as the study contingencies, or natural contingencies, as contrasted to artificial or unnatural contingencies.

DISCLOSURE OF INVENTION

The present invention, as illustrated by way of a flowchart in FIG. 13, provides a method of predicting the transfer limit or the amount of remedial action required to maintain stability of a power system in the event of a study contingency by determining a transient energy margin, comprising the steps of:

a) providing a computer model of the system (reference numeral 10);

b) simulating the study contingency using a step by step time integration method (reference numeral 12);

c) measuring the effect on the energy properties in the system which resulted from the study contingency, and if the measured energy properties indicate instability, calculating the transient energy margin from the corrected kinetic energy (reference numeral 14); and d) if the measured energy properties indicate stability, introducing an artificial contingency into the model which is of sufficient duration to make the system unstable, and measuring the transient energy margin as the difference between the corrected kinetic energy after the artificial contingency and the minimum value of the corrected kinetic energy after the artificial contingency, after compensating for the potential energy change introduced into the system by the artificial contingency (reference numeral 16).

BRIEF DESCRIPTION OF THE DRAWINGS

In drawings which illustrate a preferred embodiment of the invention.

BEST MODE(S) FOR CARRYING OUT THE INVENTION

The method disclosed is implemented using the Power Technologies Incorporated PSS/E transient stability program. The automation process is achieved using an expert system, the design of which is disclosed in a paper by K. Demaree et al. entitled "An On-Line Dynamic Security Analysis System Implementation" presented at the February 1994 IEEE Winter meeting, the contents of which are incorporated herein by reference. In the present invention, the kinetic energy KE of the simulated system, the corrected kinetic energy and the minimum of the corrected kinetic energy $KE_{emin}$ are calculated according to the PSS/E program.

Figure 1:
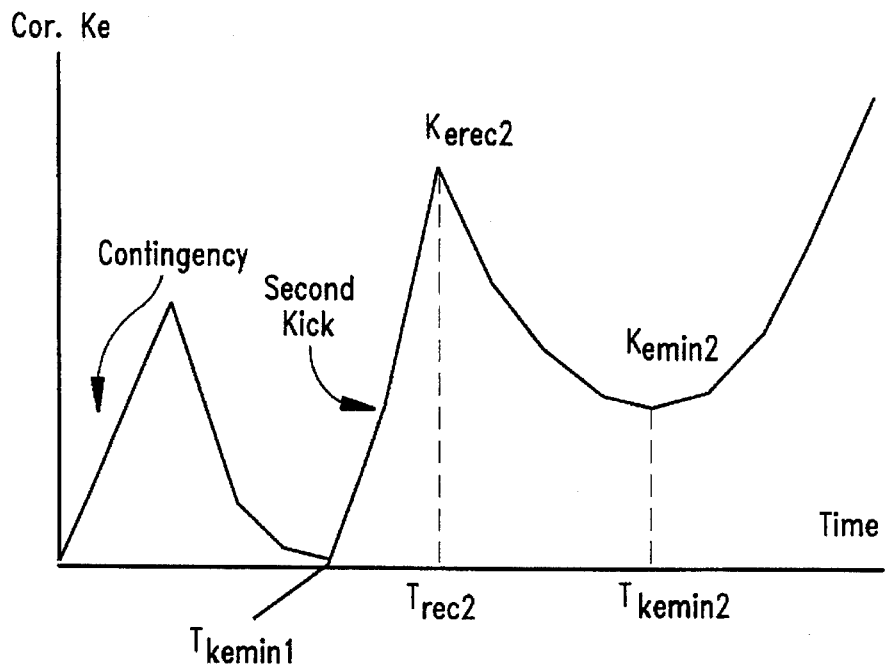
FIG. 1 is a graph showing the variation of the corrected Kinetic energy over time in response to first and second contingencies.
Figure 2:
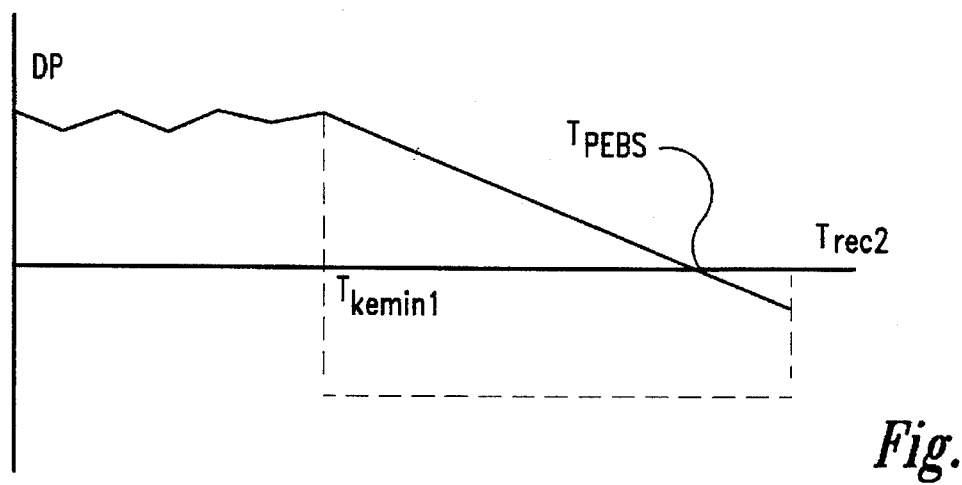
FIG. 2 is a graph showing the dot product following a fault.

With reference to FIG. 1, in summary, the method of the present invention operates as follows. The vertical axis in FIG. 1 is the corrected kinetic energy, and the horizontal axis is time t. A first fault or study contingency is introduced into the model at t=0. After the contingency, at $t=T_{kemin1}$, the minimum of the corrected kinetic energy $K_{emin1}$ is identified. If the minimum is greater than 0, indicating that the system is unstable, the margin is calculated from the value of the corrected kinetic energy at this point. If the system is stable at $t=T_{kemin1}$, then $K_{emin}=0$ at that time, and a second artificial contingency (referred to as the "second kick") which is long enough to make the system unstable, is applied and the simulation is continued until the second minimum of kinetic energy $K_{emin2}$ is obtained. This point also reflects the crossing of the PEBS (potential energy boundary surface) as shown in FIG. 2, in which the vertical axis is the dot product of the machine acceleration and angle vectors ("the Dot Product") and the horizontal axis is time. The transient energy margin is then calculated using the values of the corrected kinetic energy at the second minimum of kinetic energy $K_{emin2}$, and the value of the corrected kinetic energy after the second fault recovery $K_{erec2}$ taking into account adjustments due to potential energy change during the Second Kick. The corrected kinetic energy injected into the system by the Second Kick minus the value of the corrected kinetic energy left in the system at the crest of the potential energy hill (PEBS crossing) should give the transient energy margin, which should be adjusted for the potential energy change during the Second Kick. The transient energy margin therefore is calculated as:

$$TEM = K_{erec2} - K_{emin2} + D_{pe}$$

To determine the duration of the second fault, a long fixed duration fault is applied and the simulation is continued for one time step following the fault recovery. The duration of this fault should be long enough to make the majority of the stable cases following a single contingency unstable. In the British Columbia Hydro power system model a fixed fault of 10 cycles proved to be sufficiently long to make all the cases surviving a contingency unstable. The dot product crossing of zero is estimated by its value at the inception of the fault and the recovery point. An interpolation or extrapolation is performed to get the value of T sustained fault when it crosses the PEBS as shown in FIG. 2. The reason for this estimation is that the values calculated for dot product during the fault conditions are not correct because they use faulted network as opposed to the post-contingency network.

Figure 3:
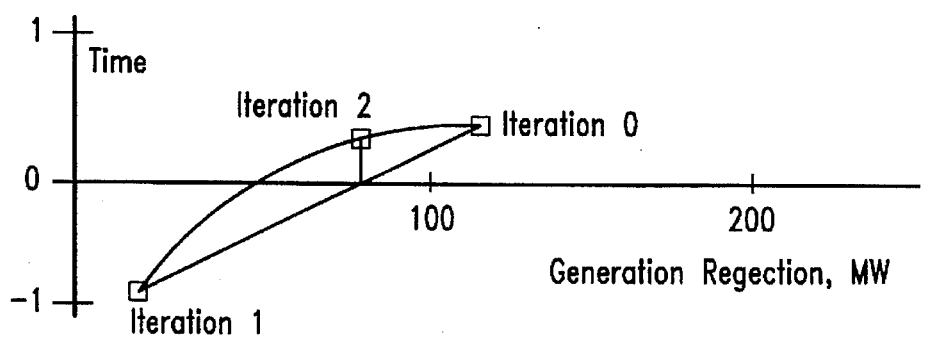
FIG. 3 is a graph showing the limit calculation using sensitivity factors.

The final output of the software tool provided by the present invention is guidelines for the operator for pre-contingency transfer limits and generation rejection immediately following a fault as a remedial action. In the present method, to find the transfer limit and generation rejection, sensitivity values are calculated for energy margin with respect to generation rejection or generation change in the case of transfer limit calculations. The existing analytical equations, as set out in "Power System Transient Stability Analysis Using Transient Energy Function Method" (Prentice Hall 1990) by A. A. Fouad and V. Vittal, are only used in the first step to calculate the conditions for the next step and are abandoned afterwards. After the second run linear interpolation is used to obtain the sensitivity values from the two previous energy margin calculations, as shown in FIG. 3.

The PSS/E program calculates for a model of the system the potential energy $V_{pe}$ as follows:

$$V_{pe} = \sum_{i=1}^{n} \int_{\theta_{1i}}^{\theta_{2i}} P_{acc}(i) d\theta_i = \sum_{i=1}^{n} \int_{\theta_{1i}}^{\theta_{2i}} \left( P_{Mi} - P_{ei} - \frac{M_i}{M_t} P_{COA} \right) d\theta_i$$

where $P_{acc}(i)$ is the acceleration of machine i;

$P_{Mi}$ is the mechanical power of machine i;

$P_{ei}$ is the electrical power of machine i;

$M_i$ is the inertia constant of machine i;

$M_t$ is the sum of the inertia constants of all the system machines; and $P_{COA}$ is the acceleration associated with the centre of system inertia.

To avoid the numerical errors which can be created when there are two integration blocks one inside the other, the potential energy integration with respect to angle was modified to integration with respect to time according to the following formula which removes the need for a second integration within each time step:

$$V_{pe} = \sum_{i=1}^{n} \int_{\theta_{1i}}^{\theta_{2i}} P_{acc}(i) d\theta_i = \sum_{i=1}^{n} \int_{t_1}^{t_2} P_{acc} \frac{d\theta_i}{dt} dt$$

To calculate the Potential energy compensation, the above integration is approximated using the values of $P_{acc}$ just before the fault and at the fault recovery. Using a trapezoidal rule, the change in potential energy can be calculated as:

$$\sum_{i=1}^{n} [Pacc_i(t_1) + Pacc_i(t_2)]*(Angle_i(t_2) - Angle_i(t_1))/2$$

As noted above, $V_{pe}$ is calculated using the integration with respect to time as follows:

$$V_{pe} = \sum_{i=1}^{n} \int_{t_1}^{t_2} \left( P_{acc}(i) \frac{d\theta_i}{dt} \right) dt = \sum_{i=1}^{n} \int_{t_1}^{t_2} P_{acc} Speed_{coi}(i) \cdot w_o \cdot dt$$

Therefore the derivative of the above equation is used to calculate the potential energy compensation as follows:

$$\text{Margin Compensation} = \sum_{i=1}^{n} \left[ \frac{\partial V_{pe}}{\partial t} \bigg|_{t_1} + \frac{\partial V_{pe}}{\partial t} \bigg|_{t_2} \right] (t_2 - t_1)/2.$$

The following steps are followed in the implementation of the algorithm according to the preferred embodiment of the invention:

1. Determine $K_{emin1}$ and $T_{kmin1}$ after the contingency.

2. If $K_{emin1}$ is larger than zero, then the margin=$-K_{emin1}$. If $k_{emin1}=0$ go to step 3.

3. At $T_{kemin1}$ apply a long fixed duration fault (e.g. 10 cycles) and continue the simulation for one more time step.

4. Get the values of Dot Product at $T_{kemin1}$ and $T_{rec2}$ and interpolate to get $T_{pebs}$ using the relationship $$T_{pebs} = T_{kemin1} + (DP_{kemin1}) \frac{(T_{rec2} - T_{kemin1})}{(DP_{kemin1} - DP_{rec2})}$$

(See FIG. 2)

5. Go back to step 1, apply another fault shorter than $T_{pebs}$ and simulate until the corrected kinetic energy is minimum ($T_{kemin2}$).

6. Determine the margin taking into account the margin compensation.

Other variations of the Second Kick method are possible, all of which involve inserting a second artificial contingency into the simulation after a first fault has recovered to a stable system. Such variations could vary the shape and timing of the "second kick" or the properties of the monitored energy. Other variations for example are a) a sudden impulse change in mechanical power; b) a sudden impulse change in speed; or c) an intermittent sustained fault. The common feature of these variants, according to the invention, is that a simulation of the system is first produced with a study contingency, followed by an artificial change or contingency ("second kick") to obtain the margin.

EXAMPLE 1

A test was conducted for a simulated fault on a 500 kv line close to a generation system having two generating stations (GMS and KMO) according to the following sequence of events (the study contingency):

| Time (cycles) | Event |
| --- | --- |
| 0 | 3 phase fault at a 500 kV bus |
| 2 | Clear fault |
| 4 | Bypass series capacitor if rating is exceeded |
| 9 | Switch 200–400 MW of braking resistor on. Trip amount of generator required to maintain stability. |
| 35 | Reclose on fault at the master end of faulted line. |
| 39 | Clear fault. |
| 44 | Switch braking resistor off. |

Figure 4:
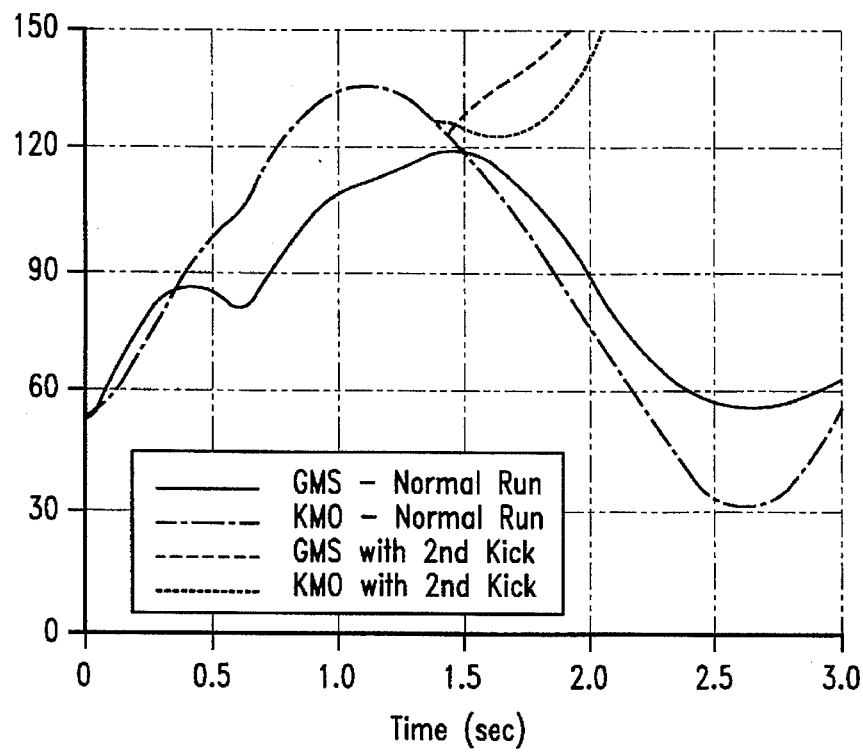
FIGS. 4 to 9 are graphs illustrating an application of the method of the invention to a first study contingency.
Figure 5:
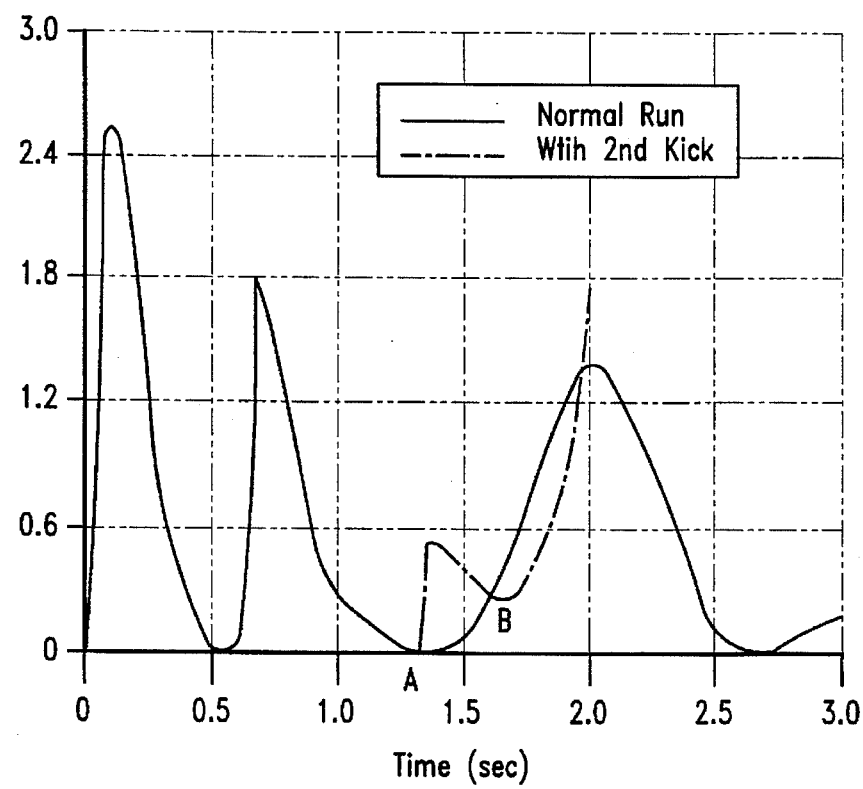
Figure 6:
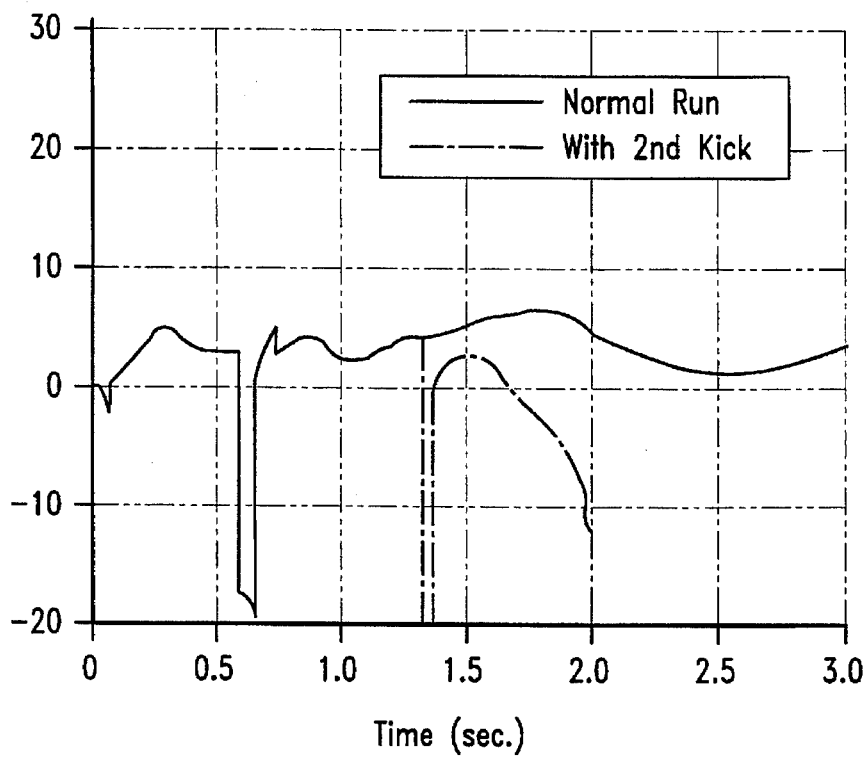
Figure 7:
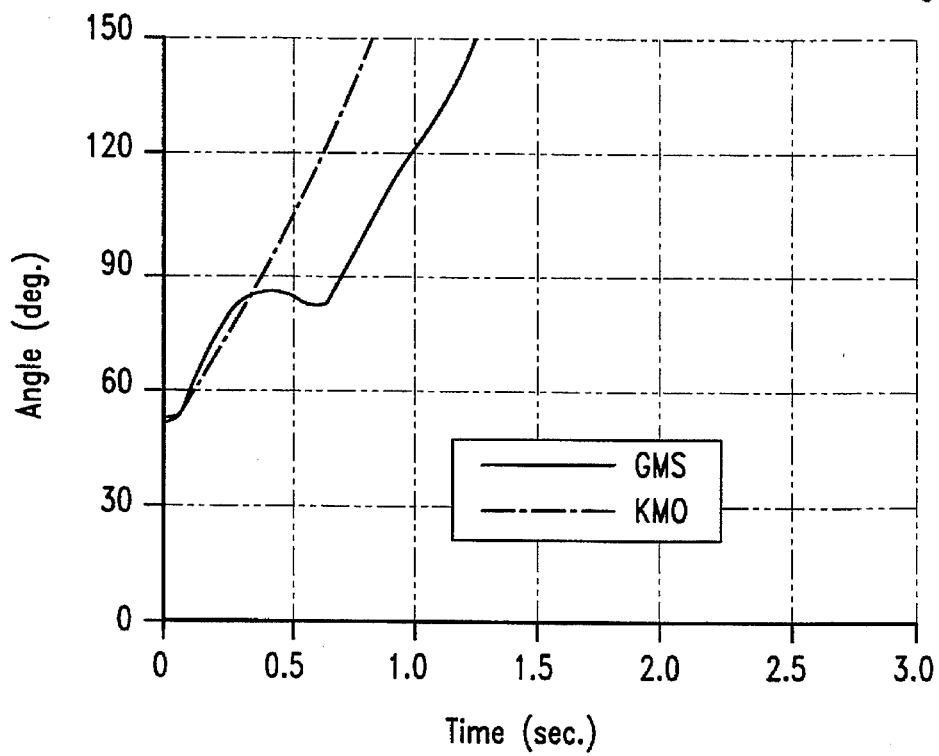
Figure 8:
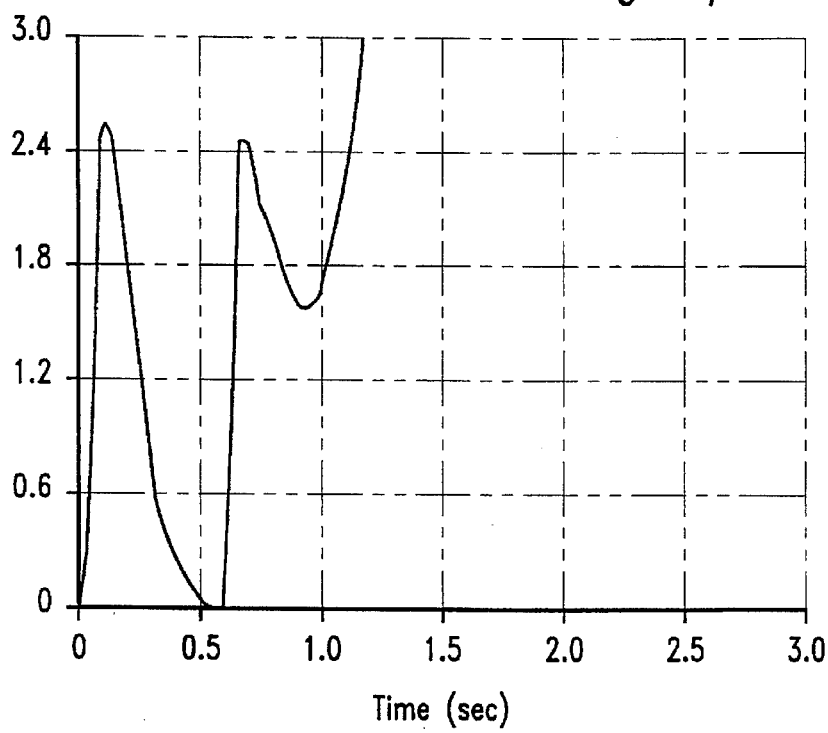
Figure 9:
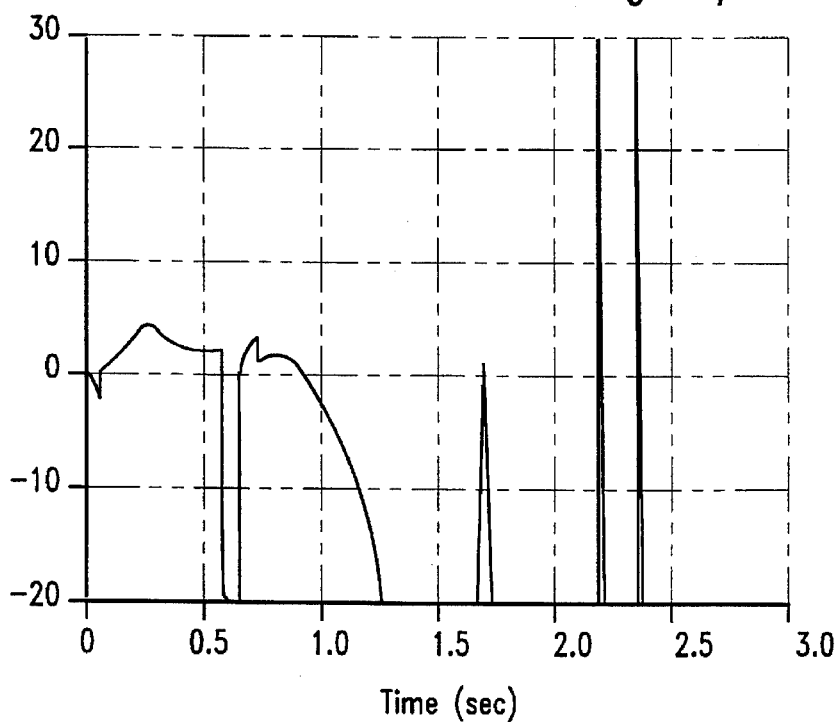

FIGS. 4 to 6 show the simulation results following the contingency with one generation unit rejection. The angle on the vertical axis in FIG. 4 is the rotor angle. The vertical axes in FIGS. 5 and 6 are the corrected kinetic energy and dot product respectively. Point A in FIG. 5 corresponds to the minimum corrected kinetic energy ($K_{emin1}$) of zero, indicating that the case is stable. The second curve in FIG. 5 shows the same results, this time applying a fault of 2 cycles following point A. The simulation is stopped at point B corresponding to the minimum kinetic energy following the Second kick. On the basis of these results, the transient energy margin was calculated at 0.3 (see FIG. 6). The fault duration of 2 cycles was derived by applying a sustained fault of 10 cycles and by interpolation of Dot Products. FIGS. 7 through 9 show the response of the system subjected to the same disturbance without any generation rejection. Again the angle on the vertical axis in FIG. 7 is the rotor angle. The vertical axes in FIGS. 8 and 9 are the corrected kinetic energy and dot product respectively. In this case the margin determined was −1.6. On the basis of the sensitivity results given, the critical generation shedding is determined to be at 84 MW.

EXAMPLE 2

A second test was conducted for a simulated fault on a 500 kv line close to a system having two generating stations (MCA and REV) according to the following sequence of events (the study contingency):

| Time (cycles) | Event |
| --- | --- |
| 0 | Fault (single and 3 phase) |
| 2 | Series capacitor control. |
| 4 | Clear fault |
| 9 | Trip generator to maintain stability |
| 90 | Reclose on fault at the master end (single and 3 phase) |
| 94 | Clear fault.(3 phase) |

Figure 10:
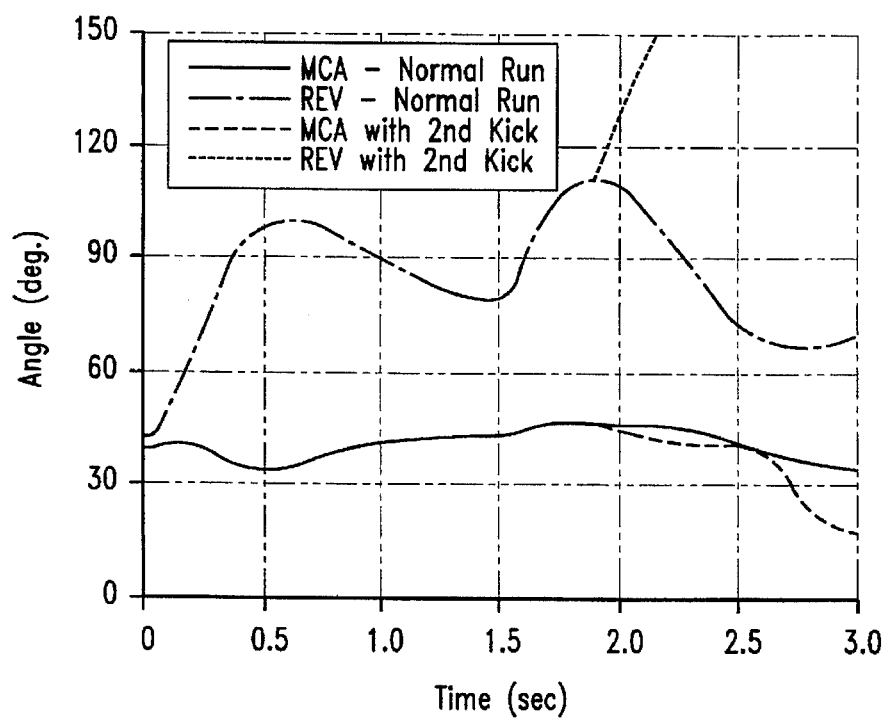
FIGS. 10 to 12 are graphs illustrating an application of the method of the invention to a second study contingency.
Figure 11:
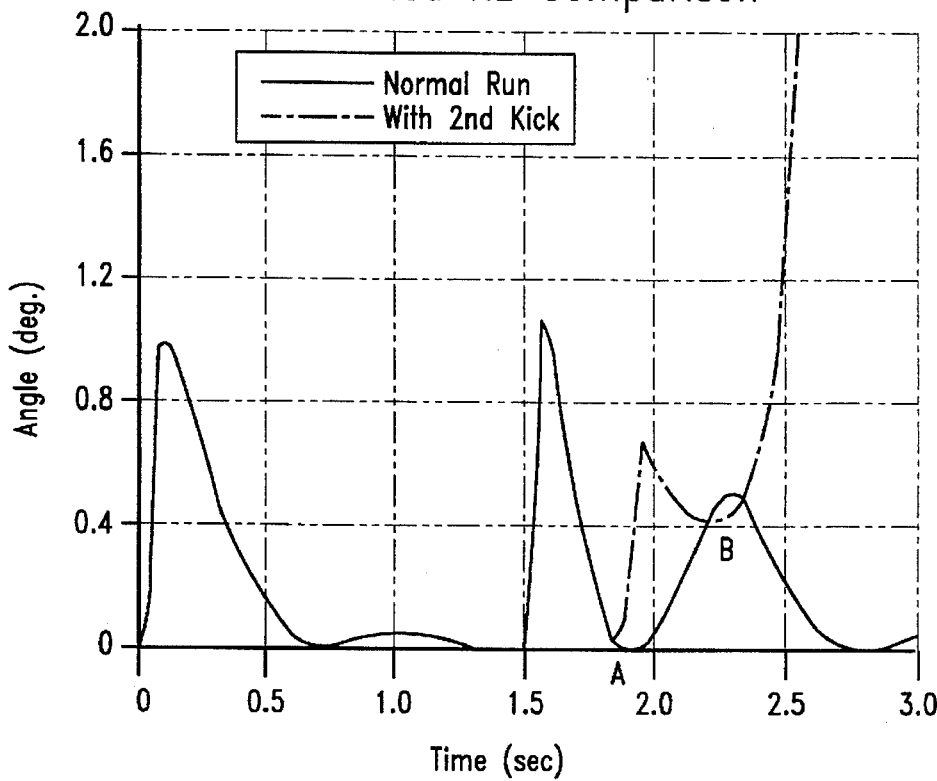
Figure 12:
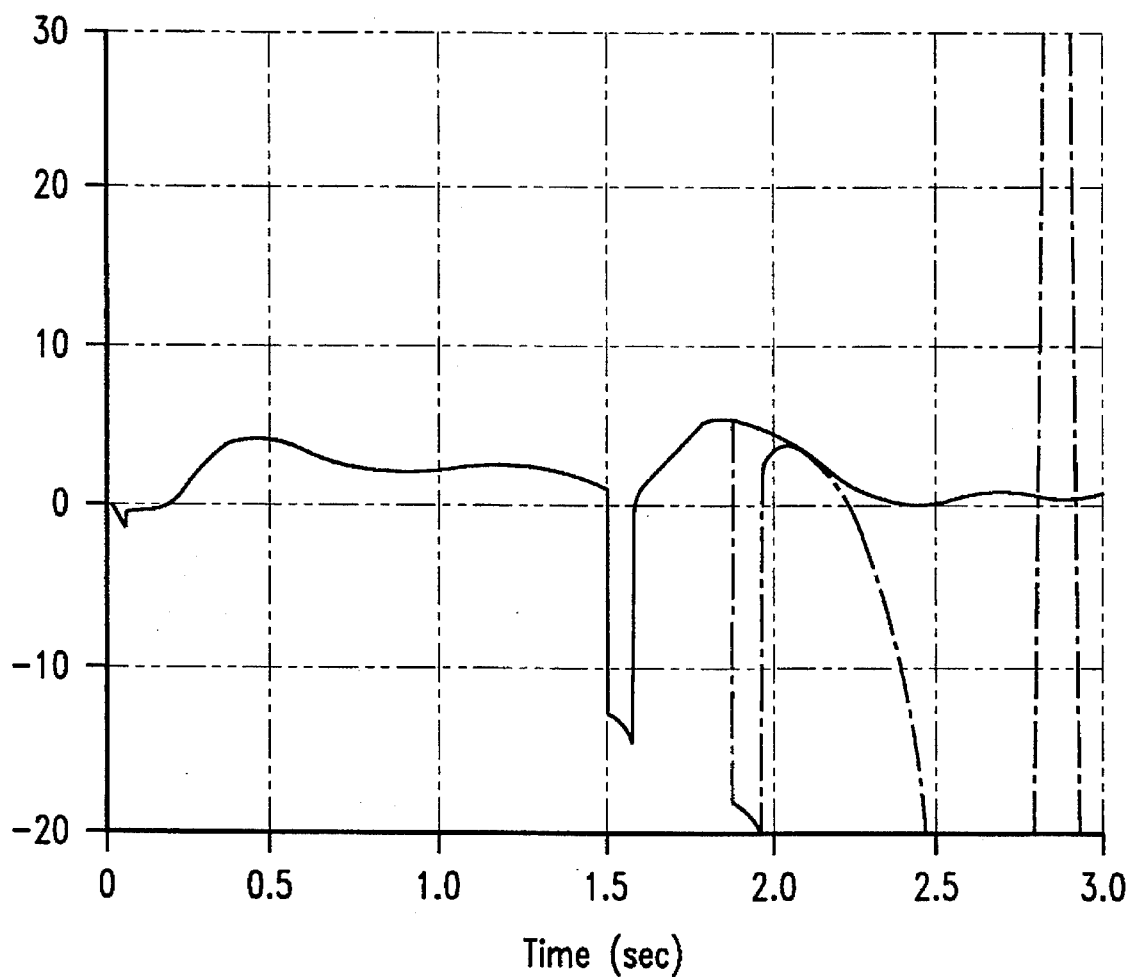
Figure 13:
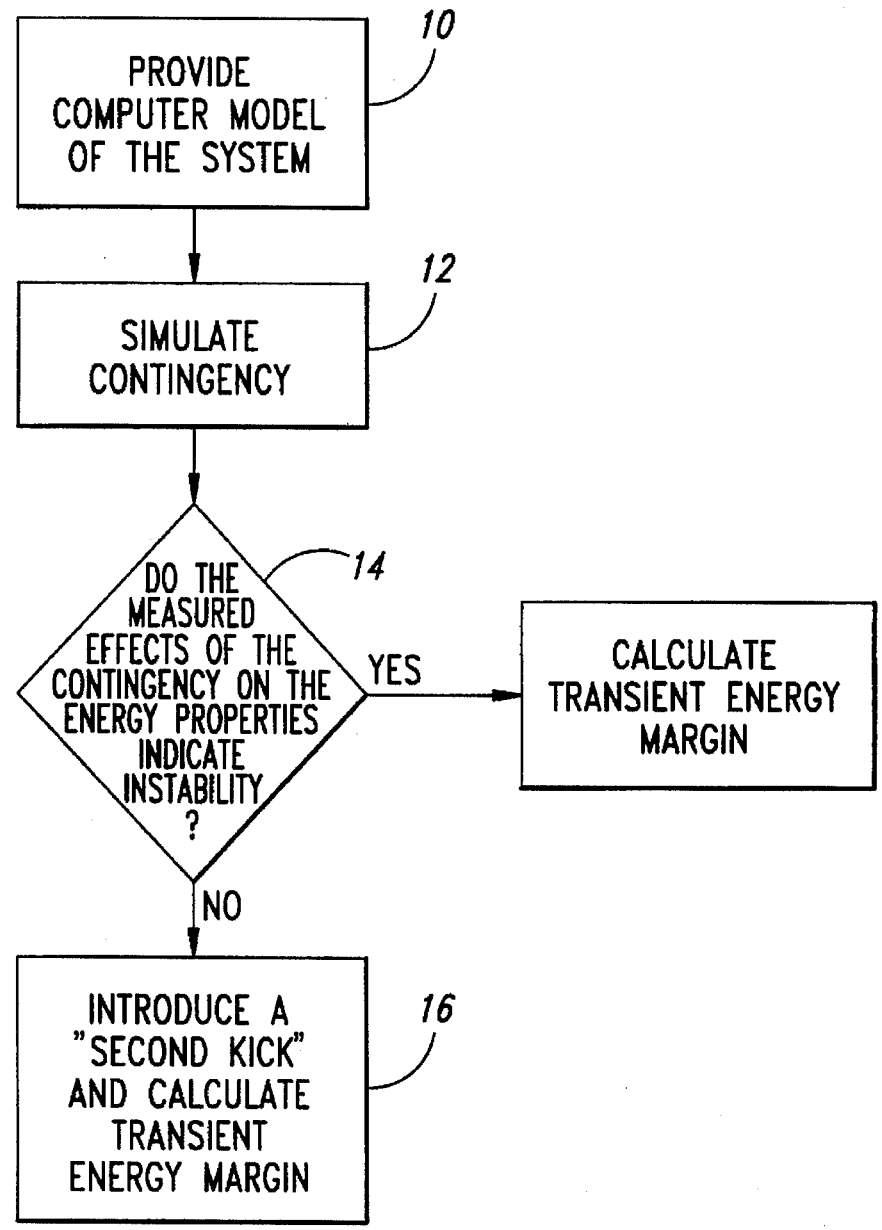
FIG. 13 is a flow chart diagram illustrating the method of the invention.

FIGS. 10 to 12 show the simulation results following the contingency with no generation unit rejection. The vertical axis in FIG. 10 is the rotor angle. The vertical axes in FIGS. 11 and 12 are the corrected kinetic energy and dot product respectively. Point A in FIG. 11 corresponds to the minimum corrected kinetic energy ($K_{emin1}$) of zero, indicating that the case is stable. The second curve in FIG. 11 shows the same results, this time by applying a fault of 5.5 cycles following point A. The simulation is stopped at point B corresponding to the minimum kinetic energy following the Second kick. On the basis of these results, the transient energy margin was calculated as 1.0 (see FIG. 12). The fault duration of 5.5 cycles was derived by applying a sustained fault of 10 cycles and by interpolation of Dot Products.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of operating an electrical power network at a stable state by predicting the transfer limit or the amount of remedial action required to maintain stability of a power system in the event of a study contingency by determining a transient energy margin, and taking said amount of remedial action in the event of an actual fault in the power system, comprising the steps of:

a) providing a computer model of the system, including calculating a corrected kinetic energy;

b) simulating the study contingency using a step by step time integration method;

c) measuring the effect on the energy properties in the system which resulted from the study contingency, and if the measured energy properties indicate instability, calculating the transient energy margin from the corrected kinetic energy; and d) if the measured energy properties indicate stability, introducing an artificial contingency into the model which is of sufficient duration to make the system unstable, and measuring the transient energy margin as the difference between the corrected kinetic energy after the artificial contingency and the minimum value of the corrected kinetic energy after the artificial contingency, after compensating for the potential energy change introduced into the system by the artificial contingency; and e) using the transient energy margin so calculated to calculate an amount of remedial action required to maintain stability of the power system in the event of said study contingency, and taking said amount of remedial action is the event of an actual fault in the power system.

2. A method of operating an electrical power network at a stable state by assessing the dynamic security limits of a power system by determining a transient energy margin, predicting the required remedial action in the form of transfer limits or remedial steps in the event of a fault in the power system and taking remedial action in the form of transfer limits or remedial steps in the event of an actual fault in the power system, comprising the steps of:

a) providing a real-time computer model of the power system;

b) simulating a study contingency using a step by step time integration method;

c) determining $K_{emin1}$ and $T_{kmin1}$ after the study contingency;

d) if $K_{emin1}$ is larger than zero, then the transient energy margin=$[-K_{emin1}]$, If $K_{emin1}$=0 go to step e);

e) at $T_{kmin1}$ apply a long fixed duration fault and continue the simulation for one more time step;

f) get the values of the Dot Product at $T_{kemin1}$ and $T_{rec2}$ and calculate $T_{pebs}$ using the relationship:

$$T_{pebs} = T_{kemin1} + (DP_{kemin1}) \frac{(T_{rec2} - T_{kemin1})}{(DP_{kemin1} - DP_{rec2})}$$

where DP is the Dot Product g) go back to step c), apply another fault shorter than $T_{pebs}$ and simulate until the corrected kinetic energy is minimum ($T_{kemin2}$);

h) determine the transient energy margin taking into account the margin compensation;

i) use the transient energy margin to calculate the transfer limits or the remedial steps required to maintain the power system in a stable state in the event of the contingency;

j) taking remedial action in the form of said calculated transfer limits or remedial steps in the event of an actual fault in the power system.

* * * * *